(12) United States Patent
Heger et al.

(10) Patent No.: US 7,181,853 B2
(45) Date of Patent: Feb. 27, 2007

(54) MODULAR LASER LAYOUT SYSTEM

(75) Inventors: Charles E. Heger, Saratoga, CA (US); Norman L. Krantz, San Jose, CA (US); Lawrence F. Miller, Los Gatos, CA (US); Charles J. Stauss, Los Gatos, CA (US)

(73) Assignee: Zircon Corporation, Campbell, CA (US)

( * ) Notice: Subject to any disclaimer, the term of this patent is extended or adjusted under 35 U.S.C. 154(b) by 87 days.

(21) Appl. No.: 10/701,940

(22) Filed: Nov. 4, 2003

(65) Prior Publication Data

US 2005/0005462 A1    Jan. 13, 2005

Related U.S. Application Data

(60) Provisional application No. 60/486,696, filed on Jul. 11, 2003.

(51) Int. Cl.
*G01C 15/00* (2006.01)

(52) U.S. Cl. .......................................... 33/286; 33/281

(58) Field of Classification Search .......... 33/DIG. 21, 33/DIG. 1, 285–286, 281, 347, 288
See application file for complete search history.

(56) References Cited

U.S. PATENT DOCUMENTS

| | | | | |
|---|---|---|---|---|
| 4,466,196 A | * | 8/1984 | Woodruff | 33/288 |
| 5,144,487 A | | 9/1992 | Hersey | |
| 5,394,616 A | * | 3/1995 | Claxton | 33/DIG. 21 |
| 5,400,514 A | | 3/1995 | Imbrie et al. | |
| 5,469,301 A | * | 11/1995 | Graham | 359/831 |
| 5,539,990 A | * | 7/1996 | Le | 33/283 |
| 5,864,956 A | * | 2/1999 | Dong | 33/227 |
| 5,983,510 A | * | 11/1999 | Wu et al. | 33/227 |
| 6,005,719 A | * | 12/1999 | Rando | 33/286 |
| 6,035,540 A | | 3/2000 | Wu | |
| 6,178,649 B1 | * | 1/2001 | Wu | 33/286 |
| 6,202,312 B1 | | 3/2001 | Rando | |
| 6,347,457 B1 | * | 2/2002 | Espinoza et al. | 33/288 |
| 6,360,446 B1 | * | 3/2002 | Bijawat et al. | 33/451 |
| 6,430,823 B1 | * | 8/2002 | Seki | 33/281 |
| 6,739,062 B2 | * | 5/2004 | Jan et al. | 33/286 |
| 6,829,834 B1 | * | 12/2004 | Krantz | 33/286 |
| 2001/0027611 A1 | * | 10/2001 | Clinton | 33/290 |
| 2004/0118001 A1 | * | 6/2004 | Turpin | 33/760 |
| 2004/0216313 A1 | * | 11/2004 | Marshall et al. | 33/286 |

OTHER PUBLICATIONS

BMI Laser (Date Unknown). "Laser Technology," describing laser-levelling technology and its advantages, BMI Catalog, pp. 42-56.
BMI Laser (Date unknown). "Time-Saving and Precise Laser-Measuring Instruments," located as http://www.bmi.de/en/seite_laser-nivellietechnikl.html, last visited on Sep. 30, 2003, 3 pages total.
Zircon Corporation (Date Unknown). Profile of the Company and Company's products, 2 pages total.
International Search Report mailed on Nov. 9, 2004 for pCT application No. PCT/US2004/022631 filed on Jul. 12, 2004, 4 pages.

* cited by examiner

*Primary Examiner*—Yaritza Guadalupe-McCall
(74) *Attorney, Agent, or Firm*—Morrison & Foerster LLP

(57) ABSTRACT

A light emitting module and a modular light emitting system with leveling capability. The system relates to light-based (e.g. lower-based) layout tools of the type used in the construction industry. More specifically, the system relates to a modular light emitting system for projection visible patterns, such as dots, lines, cross-lines and other patterns, on one or more distant surfaces for purposes of alignment, construction, verification and the like.

31 Claims, 8 Drawing Sheets

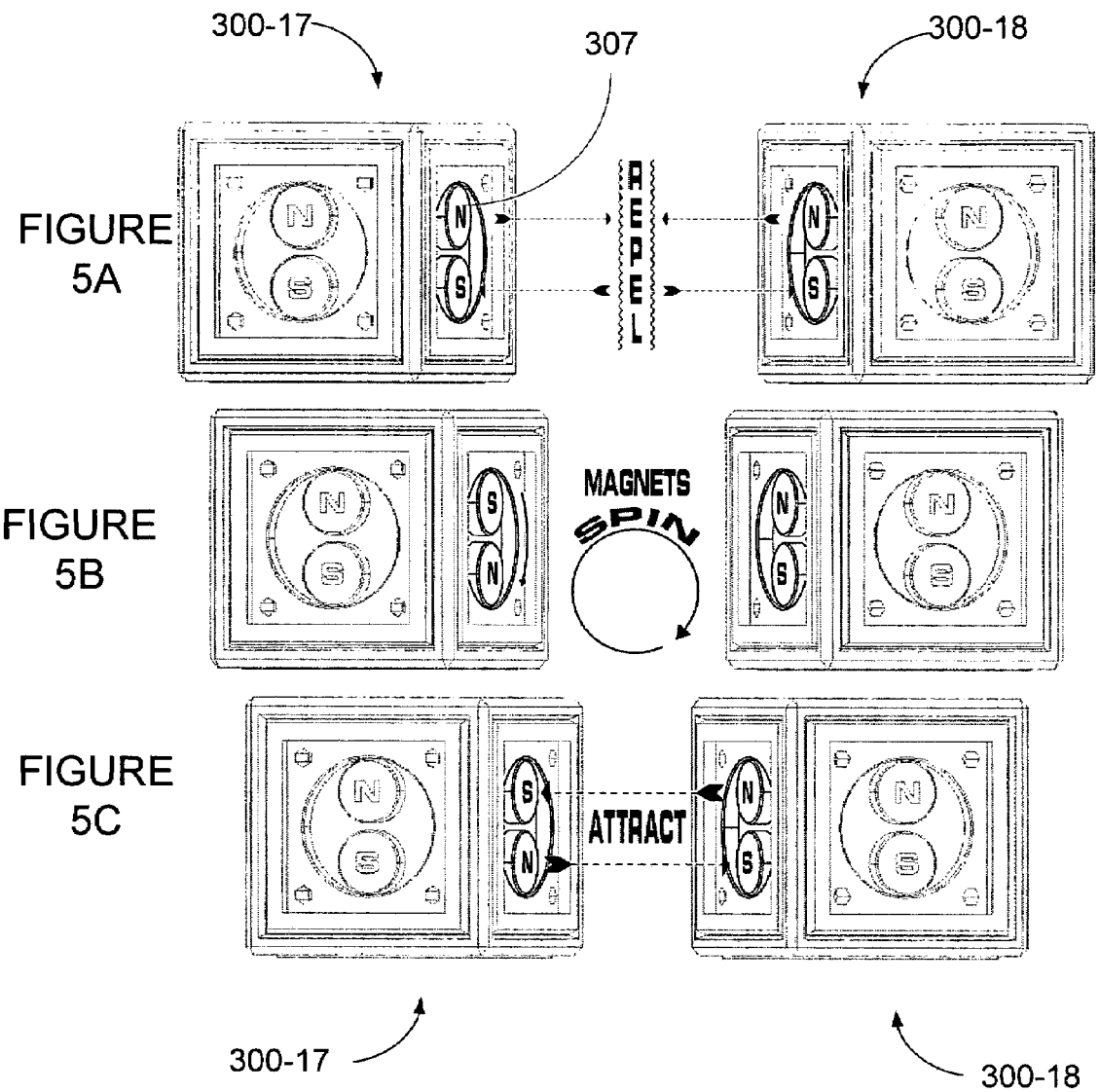

MODULAR LASER LAYOUT SYSTEM

BACKGROUND OF THE INVENTION

This application claims priority to provisional application Ser. No. 60/486,696, filed Jul. 11, 2003 entitled "MODULAR LASER LAYOUT SYSTEM", Charles E. HEGER, et al.

This invention relates to a modular layout system used, for example, to provide plumbing and leveling for projection of a laser beam.

There are numerous available laser dot and laser line generators used, e.g., in the construction industry. Some laser generators emit a stationary laser beam resulting in a projection of a single fixed dot. Other laser generators emit a wedge of laser light in a plane to project a single fixed line. Still other laser generators project multiple fixed laser dots or lines. Spinning lasers project a laser line 360-degrees around a room by spinning a laser beam about an axis.

Many such laser generators utilize a self-leveling mechanism to project dots or a line. The self-leveling mechanism typically includes a suspended pendulum with one or more lasers attached to the pendulum and includes a mechanical device for adjusting the laser and pendulum assembly to achieve a desired level of accuracy. Other self-leveling mechanisms use a liquid and liquid sensors to set a laser beam's orientation. A spinning laser that incorporates a self-leveling mechanism can project a level line along, e.g., the inside perimeter of a room. Such level lines may be helpful for installation of, for example, wainscoting, cabinets, countertops and windows.

Unfortunately, known laser generators are inflexible in their design and lack ease of adaptability. Although many laser generators included a self-leveling capability, each is fixed in its functionality. For example, a spinning laser might only be capable of projecting a horizontal line (perpendicular to the gravitational pull) and not capable of projecting vertical lines. Another laser generators project orthogonally arranged sequences of dots but are unable to project orthogonal lines.

Before selecting a laser dot or laser line generator, a purchaser is forced to determine the requirements of the ultimate application and the intended use. Once a laser generator is purchased, the user is forever limited to that particular fixed configuration. When requirements change, the user is forced to select and purchase new equipment.

SUMMARY

A module comprising a housing having a plurality of sides, an aperture defined in a first side of the sides, and a magnetic fastener on at least two of the sides, and a light source such as a laser diode mounted within the housing, whereby the aperture allows light emitted from the light source to pass out from the housing.

Other embodiments provide a module comprising a housing having two or more reference sides, wherein each reference side defines a corresponding reference plane, and a light source in the housing and emitting light having a predetermined orientation with respect to each of the reference planes.

Still other embodiments provide a module comprising a light source, a housing including an electrically conductive member, wherein the electrically conductive member is coupled to the light source, and a conductive lead, wherein the conductive lead is electrically coupled to the light source, and wherein the conductive lead extends from the housing.

Other embodiments provide a module comprising a housing having an external conductive member providing a conductive surface and an external non-conductive member, a conductive lead, and a laser generator within the housing, the laser generator including a first conductor electrically coupling the laser generator to the conductive surface of the housing, and a second conductor electrically coupling the laser generator to the conductive lead.

Still other embodiments provide a modular system comprising a leveling platform providing a reference surface, wherein the reference surface is made substantially level, and one or more modules detachable from the leveling platform, wherein each of the modules has at least two sides that allow substantially parallel positioning on the reference surface and allow substantially parallel positioning against another module, wherein each of the modules cooperates with the reference surface to provide oriented light.

Other embodiments provide a modular system including a self-leveling platform having a level reference surface, and one or more laser modules detachable from the self-leveling platform, wherein each of the laser modules has at least one side that provides for substantially level positioning of the laser module on the reference surface, and wherein each of the laser modules cooperates with the reference surface to provide one or more oriented beams of laser light.

Features and advantages of the present invention will become more fully understood from the following detailed description and accompanying drawings.

BRIEF DESCRIPTION OF THE DRAWINGS

FIGS. 5A, 5B and 5C show a process of magnetic coupling between two modular laser modules in accordance with the present invention.

DETAILED DESCRIPTION

This detailed description discloses a modular system for, e.g., lasers or other light sources. A leveling system may include one or more laser modules resting on a self-leveling platform. The self-leveling platform adjusts a reference surface to provide a level surface. The self-leveling platform may be placed on a semi-level surface, or alternatively, may be clamped to a pole, truss or building framing. The pole may be further stabilized by a tripod base mount.

Unlike known laser systems, which often constrain a user to a single laser generation function, the present system's modular configuration uses one or more laser modules to create a flexible and versatile, multi-function laser generation system. A user no longer needs separate leveling equipment for each type of configuration he or she will need for a given task. With the same set of modular components, many different configurations are possible.

One or more modules are placed on a platform to project an image having a particular orientation to the platform. A manually adjusted leveling platform or a self-leveling platform may be considered as two circular plates, one suspended above the other and nominally near parallel, with the upper plate having the ability to be mechanically adjusted in a planar sense with respect to the lower plate.

In some embodiments, a two axis level sensor is attached to the upper plate, such that the pitch and roll of this plate may be sensed in relation to the gravitational plane. The sensor outputs are then processed and the resulting information used to drive suitable actuators, one for pitch and one for roll, such that the upper plate's surface will achieve a level condition. The degree of angular compliance between the upper and lower plate is a function of design. In some embodiments, a range of ±5 degrees of angular displacement between the plates may be accommodated.

Figure 1:
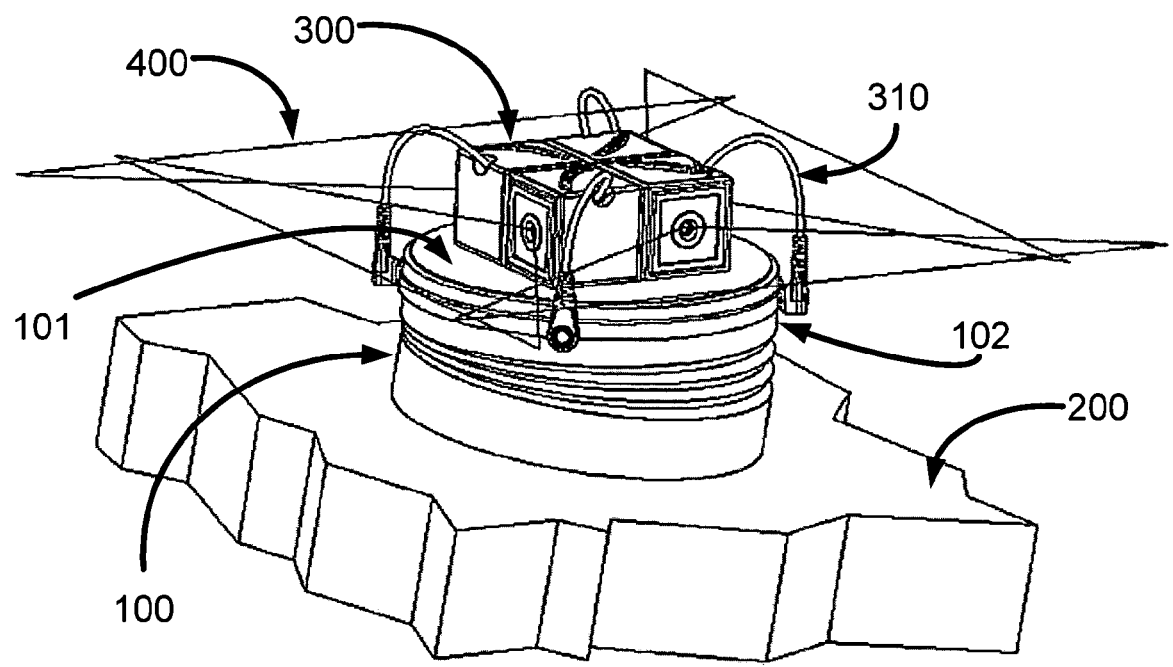
FIG. 1 illustrates a self-leveling system utilizing modular lasers on a self-leveling platform in accordance with the present invention.

FIG. 1 illustrates a self-leveling laser projection system utilizing laser modules 300 on a self-leveling platform 100 in accordance with the present invention. (The use of a laser light source is not limiting.) Self-leveling platform 100 placed on a non-level surface 200 automatically provides a level reference surface 101. An example of a suitable self-leveling platform 100 is disclosed in co-pending application Ser. No. 10/618,403 entitled "DUAL AXIS CAPACITIVE LEVEL SENSOR" filed on Jul. 11, 2003, and which is herein incorporated by reference in its entirety but this is not limiting.

The laser modules 300 are placed on the reference surface 101 of the self-leveling platform 100. The laser modules 300 emit a pattern of light 400 to project a desired pattern on a distant surface. Power may be supplied to the laser modules 300 by a power ring 102 on the self-leveling platform 100. Each module may have a power lead 310 to provide one-half of an electrical connection between the laser module 300 and the power ring 102 of the self-leveling platform 100.

The reference surface 101 of the self-leveling platform 100 may be both metallic (at least in part) for providing a second-half of the electrical conduction and ferrous (e.g., steel or iron) allowing magnetic attraction. This reference surface 101 may rotate about two axes, for example, labeled pitch and roll. Each axis may be driven by a motor system, with both motors mechanically coupled between a base of the platform 100 and the reference surface 101.

Alternatively, the reference surface 101 may be provided by a manually-leveled platform of the type well known in the field.

One or more laser modules 300 may rest on top of the reference surface 101. The laser modules 300 emit light 400 to form useful patterns against a distant surface such as a wall of a room. Each laser module 300 has an internal light source (e.g., laser) or optics for producing a particular pattern. The particular pattern may have a fixed orientation with respect to one or more sides of the laser module 300. For example, one type modular module 300 may have an internal light source and optics that generate a plane of light 400. The plane of light when directed towards a distant surface will project a line on the distant surface. The internal light source and optics may be calibrated so that the plane of light 400 emitted from the laser module 300 is parallel to a first face of the laser module 300 and perpendicular to a second face of the laser module 300. Additional laser modules 300 may be placed on the reference surface 101 and against a face of other laser module 300 to project additional patterns on distant surfaces. Once a task is complete, the laser modules 300 may be removed and reconfigured for the next task.

Each laser module 300 is designed for projecting a particular pattern of light. Additional laser modules 300 may be combined to project a number of desired patterns. Examples of projected patterns include a single dot, a single line, an orthogonally set of lines forming a cross, a sequence of evenly spaced dots, as well as other specialty configurations. By placing the necessary number and type of modules on a self-leveling platform, a user sets up a system for projecting a desired pattern. For example, a user may use a single-dot laser module 300 to mark a point on a remote wall of the room.

Figure 2A:
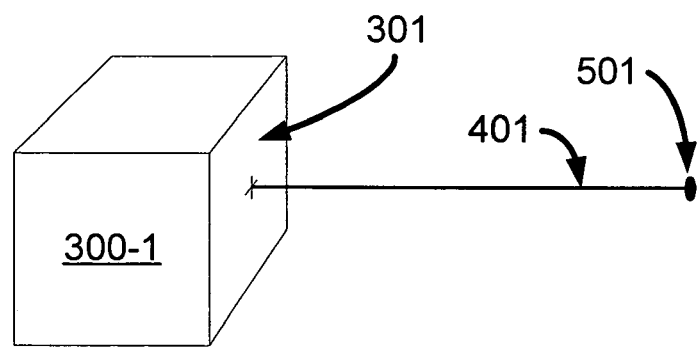
FIGS. 2A through 2E show perspective views of various types of laser modules emitting various patterns of light in accordance with the present invention.
Figure 2B:
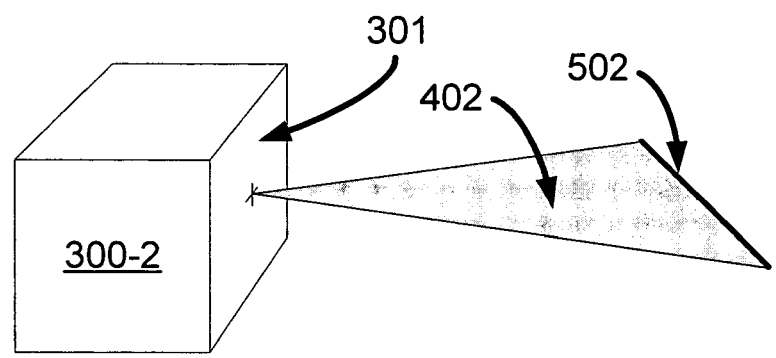
Figure 2C:
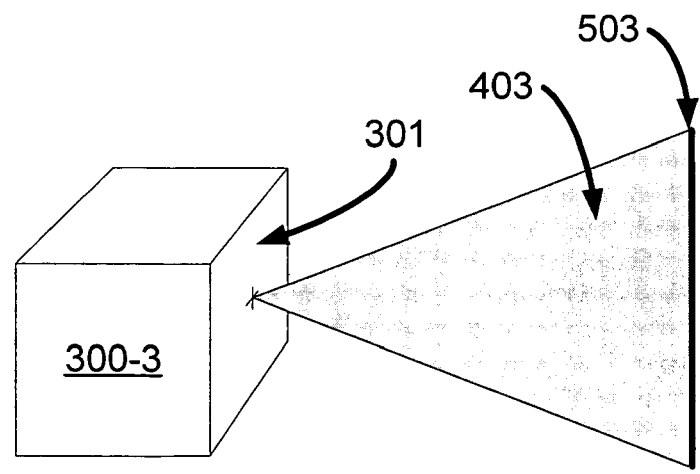
Figure 2D:
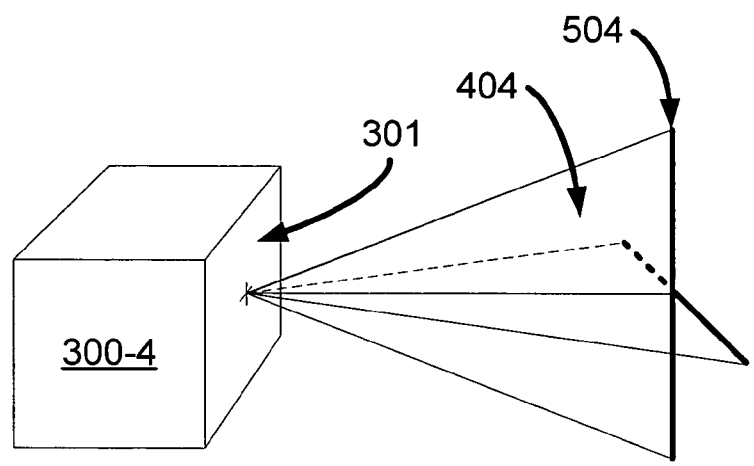
Figure 2E:
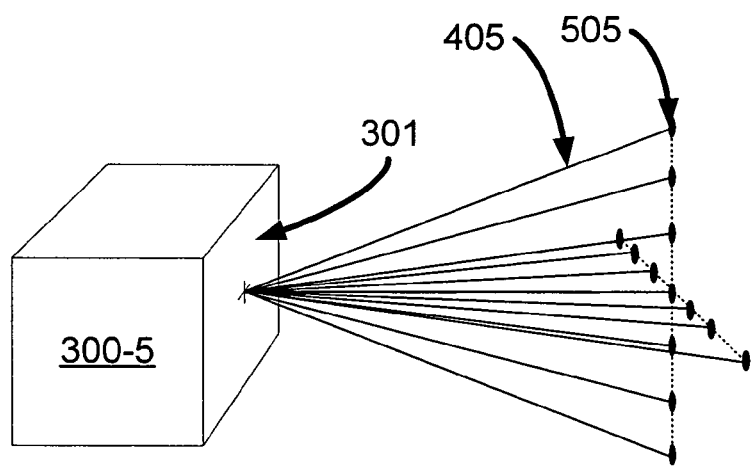

FIGS. 2A through 2E show perspective views of various types of laser modules 300 that emitting various patterns of light in accordance with the present invention. Each laser module 300 may be constructed to project a particular pattern from a windowed face 301 of the laser module 300. FIG. 2A shows a laser module 300-1 that emits a beam of light 401. The beam of light 401 projects a spot 501 on a distant surface. FIG. 2B shows a laser module 300-2 that emits a horizontal plane of light 402. The horizontal plane of light 402 results in a horizontal line 502 projected on a distant surface. FIG. 2C shows a similar laser module 300-3. Between FIG. 2B and FIG. 2C the laser module 300 has been rotated 90 degrees. The laser module 300-3 emits a vertical plane of light 403. The vertical plane of light 403 results in a vertical line 503 projected on a distant surface. FIG. 2D shows a laser module 300-4 that emits two orthogonal planes of light 404. The orthogonal planes of light 404 result in a cross-pattern of perpendicular lines 504 projection on a distant surface. FIG. 2E shows a laser module 300-5 that emits multiple beams 405 to form a pattern of dots 505 on a distant surface.

In some embodiments, each laser module 300 has one or more of its faces provided as a reference side. A reference side is manufactured by use of conventional precision machining or fabrication to a desired tolerance such that it may be positioned substantially parallel to the reference surface 101 of the self-leveling platform 100. A reference side may be substantially parallel, perpendicular, or otherwise oriented with the laser beam's orientation. Additionally, a reference side allows that face of the module to rest substantially parallel to a reference side of another laser module 300. If a side of a laser module is positioned against either another laser module 300 or the reference surface 101, that side should be a reference side.

In some embodiments, there is provided an internal mechanical adjustment within the laser module 300 for factory (or other) alignment of the emitted laser beam with respect to the one or more reference sides. The adjustment may include spacers, screws, lifts and/or other suitable mechanisms for holding proper alignment of the laser's orientation during calibration.

A laser module 300 may include a laser, associated internal circuitry and a six-sided housing (shell). The laser and circuitry are conventionally mounted within the housing. The six-sided housing may have edges of equal dimensions thereby forming a cube or may have edges of unequal dimensions. Additionally, a laser module 300 may contain an internal power source (battery) or an internal receptacle for a power source both of which are conventionally mounted. Alternatively, a laser module 300 may accept electric power from an external source, for example, a source associated with a self-leveling platform 100 such as a power ring 102 and a conductive reference surface 101.

Figure 3A:
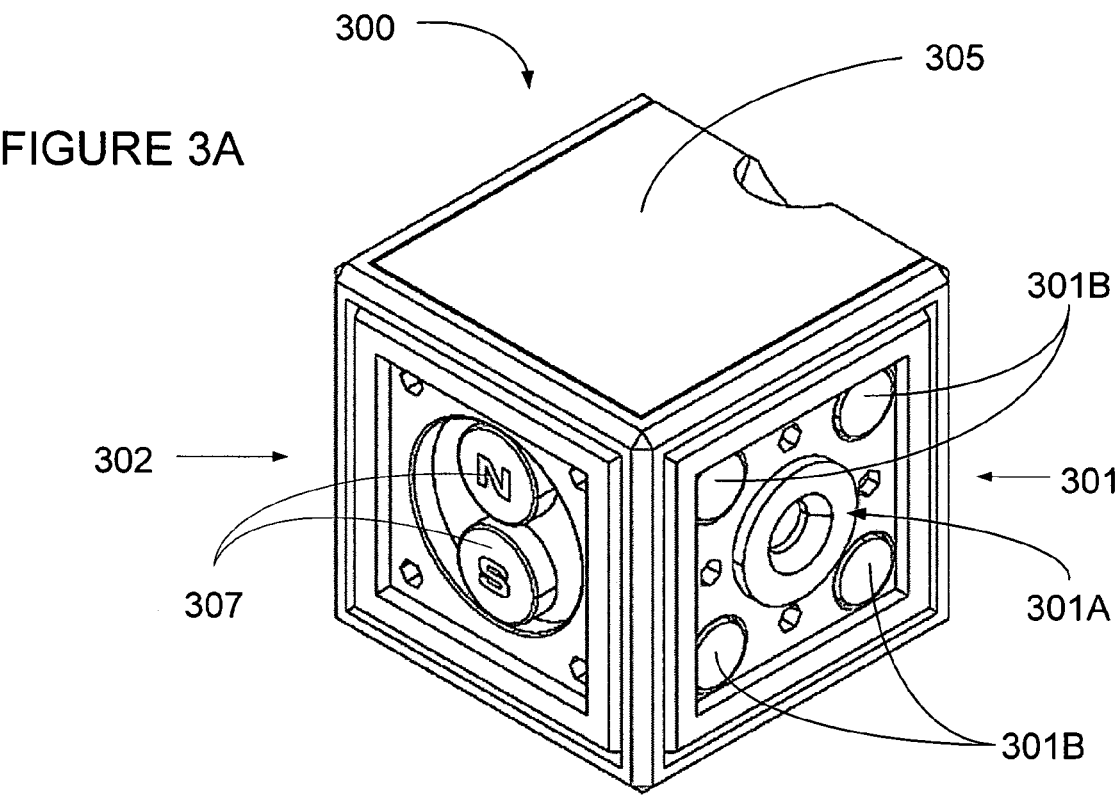
FIGS. 3A and 3B show opposing perspective views of a modular laser in accordance with the present invention.
Figure 3B:
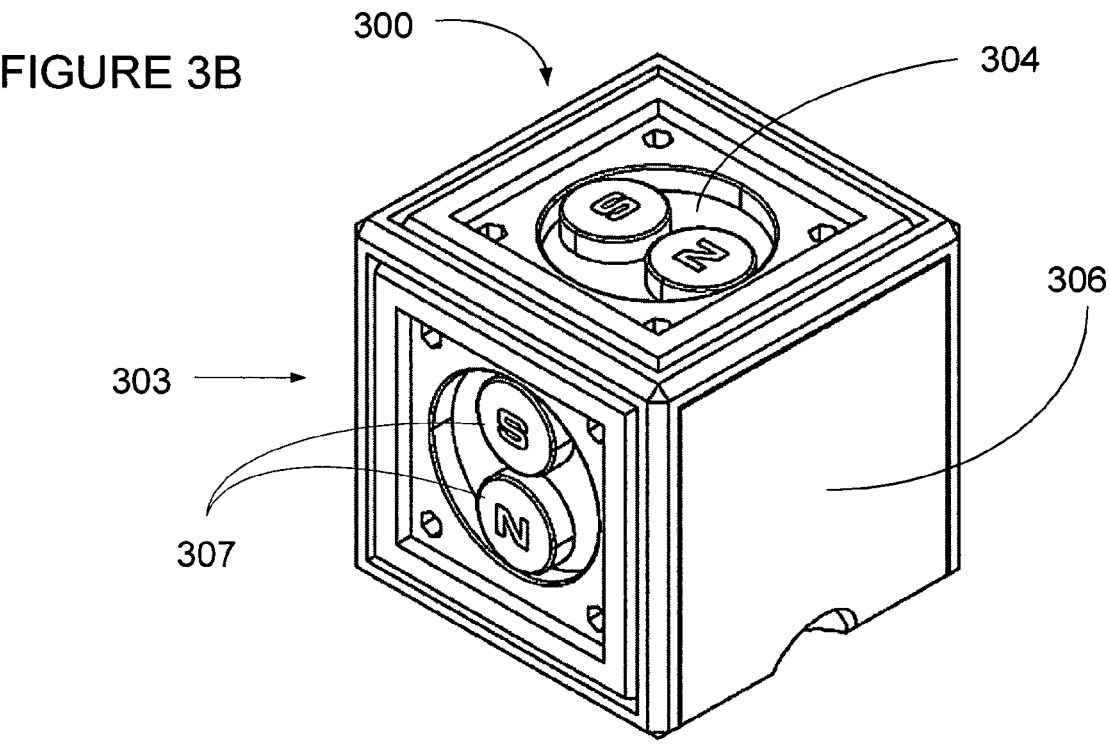

FIGS. 3A and 3B show perspective views of a laser module 300. Each face 301–306 of a module 300 may have a primary purpose. In the embodiment shown, face 301 acts as a windowed face allowing light to pass from the laser module 300. Faces 302–304 act as references sides and may provide a first electrical path to a power source. Faces 305–306 may allow for a lead 310 (shown in FIG. 1) to provide a second electrical path to the power source.

Figure 4A:
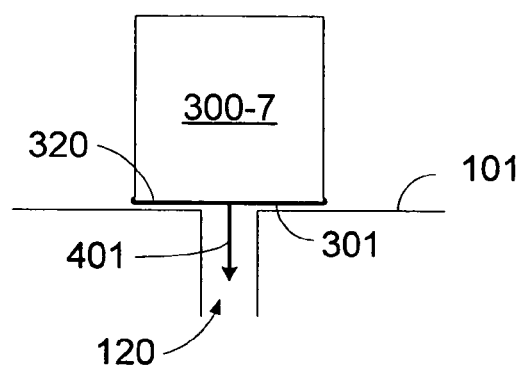
FIGS. 4A through 4F show one or more laser modules configured to emit various patters of light and having one or more reference sides in accordance with the present invention.

Face 301 of the laser module 300 has an opening or a window 301A that allows the light from the laser module 300 to pass out from the laser module 300. The laser beam's direction may be oriented to be substantially perpendicular to the plane of the windowed face 301. A windowed face 301 may also have on it magnets 301B. If module 300 is to be used to generate a downward plumb line, the laser module 300 may be positioned to emit a beam directly downwards in the direction of the Earth's gravitational pull. Some manual and self-leveling platforms 100 have a vertical pass-through hole 120 (as shown in FIG. 4A) that allows light to pass from above the reference surface 101 through and out of the bottom of the self-leveling platform 100. When a laser module 300 is positioned over the pass-through hole, magnets 301B may be used to hold the laser module 300 in place.

Reference sides 302–304 may include magnets 307 for promoting adhesion between a reference side and another reference side or the reference surface 101. Magnets 307 are described in more detail below with reference to FIGS. 5A, 5B and 5C.

FIGS. 4A through 4F show one or more laser modules 300 configured to emit various patters of light 400 and having one or more reference sides. Any of the sides of a laser module 300 may be manufactured to be a reference side. A six-sided laser module or laser cube may have one, two, three, four, five or all six of its sides manufactured as reference sides. Tasks that may require one or more reference sides may require sides to be orthogonal or parallel to an access of the emitted laser beam 400 and/or orthogonal or parallel to another reference side. A laser module 300 may be used to perform certain set of tasks depending on which faces of the laser module 300 are manufactured as reference sides.

FIG. 4A shows a side view of "plumb bob" application where the windowed face 301 is a reference side 320. The laser module 300-7 has a beam 401 that is orthogonal to its windowed face 301. The user places a single-dot generating laser module 300-7 on the reference surface 101 of a self-leveling platform 100 over a through hole 120. A single-dot laser module 300-7 emits a beam 401 that projects a point or small circular or elliptical disk on a distant surface. The through hole 120 in the self-leveling platform 100 allows beam 401 of light to pass directly through the platform 100 towards the surface of a floor.

Figures 1, 4B:
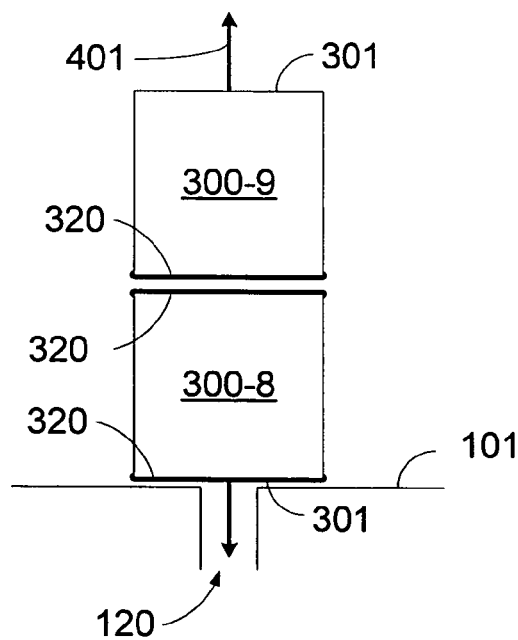
Figures 2, 4B:
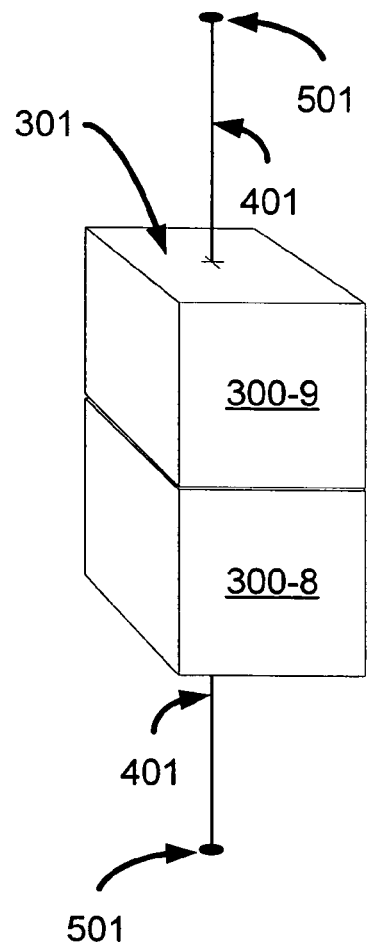

FIG. 4B-1 shows a side view and FIG. 4B-2 shows a perspective view of the plumb bob application providing a vertical floor-to-ceiling plumb bob line. By stacking two laser modules 300-8 and 300-9 on one another and directing their respective beams 401 in opposite directions, a single-axis line may be generated. A first laser module 300-8 has its windowed face 301 as a first reference side 320. A second reference side 320 is located on the side opposite of and parallel to the windowed face 301. A second laser module 300-9 has a reference side 320 located on the side opposite of its windowed face 301. The beams 401 are aligned during factory production to be orthogonal to the reference sides 320.

The pair of single-dot laser modules 300-8 and 300-9 may be stacked one on the other with beams 401 in opposite directions to generate a bright and vertical plumb line. To do so, the user first places the first single-dot generating module 300-8 on the reference surface 101 over a through hole 120 of a self-leveling platform 100. The through hole 120 in the platform 100 allows light to pass directly through the self-leveling platform 100 towards the surface of a floor. Next, the user places the second single-dot laser module 300-9 on top of the first laser module 300-8, such that the second laser module projects a beam 401 vertically upward towards the ceiling thereby creating a vertical floor-to-ceiling plumb bob line.

Figure 4C:
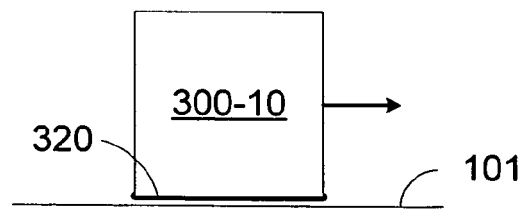

FIG. 4C shows a side view of laser module 300-10 containing a reference side 320 parallel to the emitted beam 400. This reference side 320 may be placed on the self-leveling platform 100 to emit a beam that is aligned to the reference surface 101. If the laser module 300-10 emits a linear beam of light, the beam will project a dot on a distant surface at a known height above the references surface 101. If the laser module 300-10 emits a beam forming a horizontal plane of light, the beam will project a line on a distant surface. The projected line will be parallel to the reference surface 101 and perpendicular to the Earth's gravitational pull.

Figures 1, 4D:
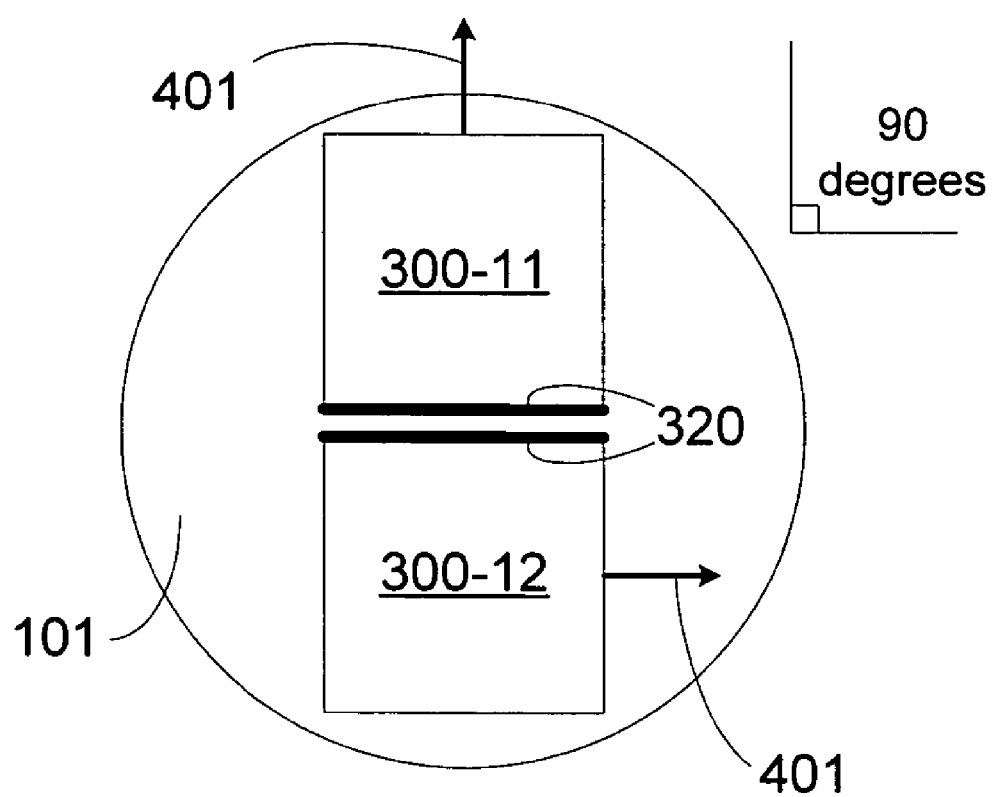
Figures 2, 4D:
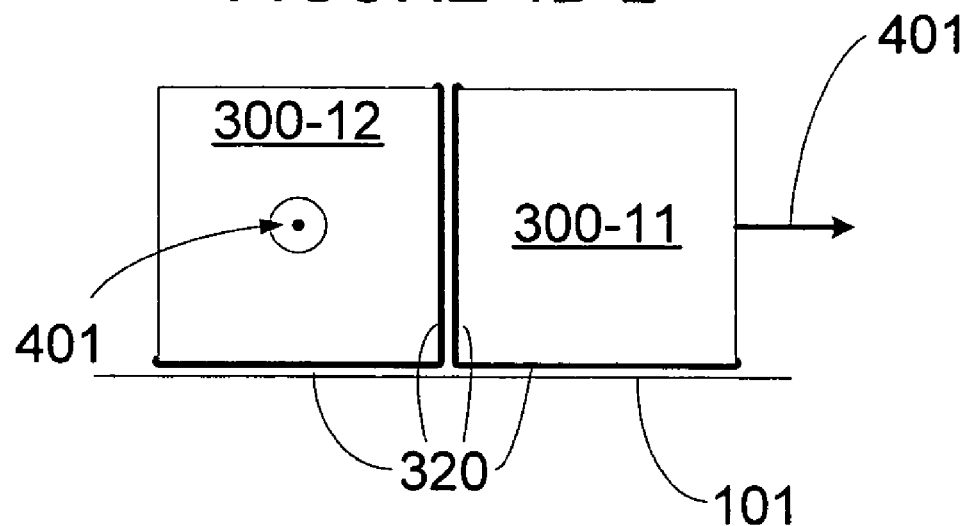

FIG. 4D-1 shows a plan view and FIG. 4D-2 shows a side view of two laser modules configured to form a 90-degree angle parallel to the plane of the reference surface 101. A first laser module 300-11 has a first reference side 320 opposite from the emitting surface and a second reference side 320 orthogonal to the first reference side 320. A second laser module 300-12 has two reference sides 320 orthogonal to each other and parallel to the emitted beam 401. The pair of laser modules 300-11 and 300-12, when reference sides 320 are placed side-by-side and on the reference surface 101, emit beams 401 that are parallel to the reference surface 101 and combine to form a 90-degree angle.

Figures 1, 4E:
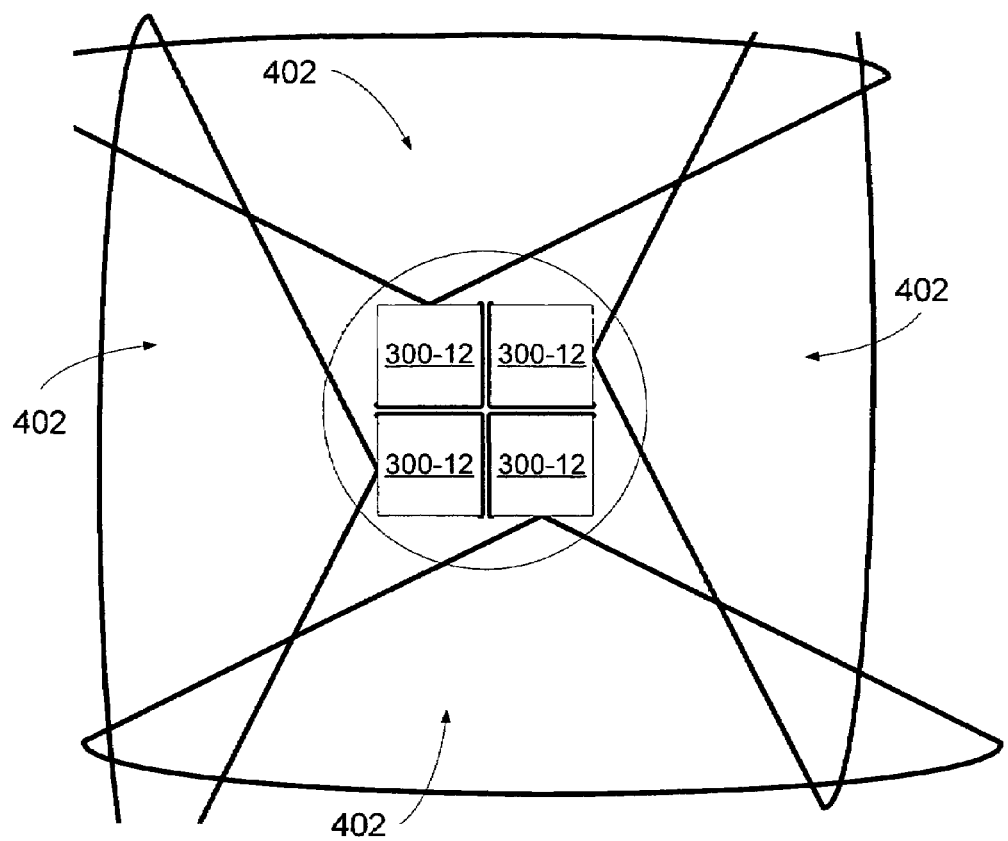
Figures 2, 4E:
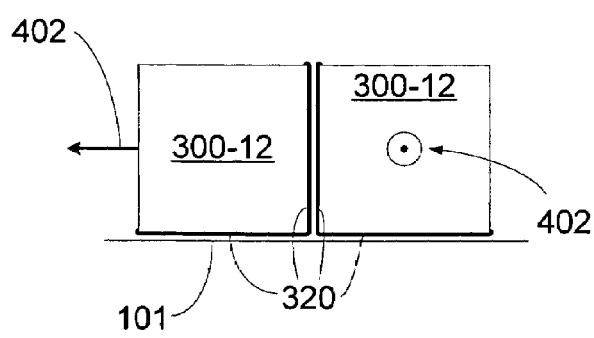

FIG. 4E-1 shows a plan view of a configuration using four similar modules 300-12 combined to project a 360-degree plane parallel to the reference surface 101. FIG. 4E-2 shows a side view of two of the four laser modules 300-12. Each laser module 300-12 contains three reference sides 320, each orthogonal to each other and separate from the windowed face. The four laser modules 300-12 may be placed next to one another such that each non-reference side is exposed and each reference side 320 abuts either a reference side 320 of another laser module 300-12 or the reference surface 101 of the self-leveling platform 100. The four laser modules 300-12 together emit a 360-degree pattern. A 360-degree pattern may be used to project a level laser beam line on the interior walls of a room, e.g., for construction purposes.

By using four laser line modules 300-12 placed on a reference surface 101 with their beams projecting horizontal planes of light 402 and with the windowed faces of the modules 300-12 positioned orthogonally to one another, a complete 360-degree horizontal line may be generated, thereby duplicating the functionality of a spinning laser often used in the field of construction. The resultant line will be advantageously brighter than that of a spinning laser due to the fact that each line from any given module projects outward at about 90-degrees whereas the spinning laser must distribute its optical power over 360-degrees. This is an important consideration when working under a high ambient light condition.

Figure 4F:
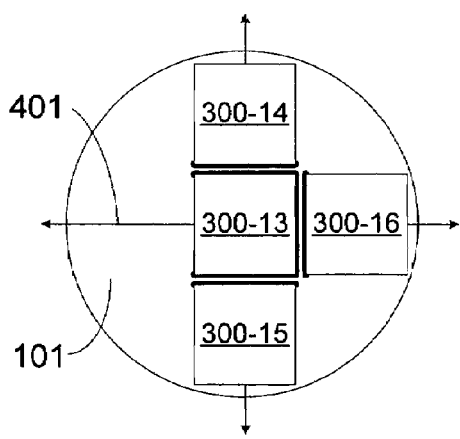

FIG. 4F shows a plan view of four laser modules 300-13 through 300-16 each configured to emit a linear beam of light 401. The four laser modules 300-13 through 300-16 may be used, for example, to emit two beams of light along a first axis parallel to the reference surface 101 and to emit two more beams of light along a second axis parallel to the reference surface 101 and perpendicular to the first axis.

Many other configurations are possible by using various combinations of laser modules 300 having various combinations of reference sides 320 that emit various patterns of light 400. A single-line laser module 300-2 may be used to emit a plane of light 402 to project a horizontal line 502 on a wall. Either two single-line laser modules 300-2, 300-3 (orthogonally positioned side-by-side) or a single-cross laser module 300-4 may be used to generate an orthogonal cross 504 on a wall. A dot-sequence laser module 300 may be designed to project dots having a constant angular spacing between adjacent laser beams. Another dot-sequence laser module 300 may project dots having progressively changing angular spacing between adjacent laser beams such that the dots are evenly spaced across a perpendicular plane.

A laser module 300 may emit any one of a variety of beams 400 to project various patterns 500 such as a dot, line, cross or other specialty configurations. It is well known how to provide such beam shapes from a conventional low powered laser. The user may mix and match different types of modules 300 for a given task. The laser modules 300 are placed on a manual or self-leveling platform 100 capable of holding multiple modules 300. A laser module 300 may be rotated, pivoted or turned so as to orient its laser beam in an infinite number of directions.

A laser module 300 with four reference sides 320 may be used in combination with equivalent laser modules 300 to create any of the above-mentioned configurations. Such a versatile laser module 300 may contain four reference sides 320 oriented such that all sides of the module, except two adjacent sides orthogonal to the windowed face, are reference sides. Alternatively, a laser module 300 may contain five or six reference sides 320. Additional reference sides 320 allows the laser module 300 to have other laser modules 300 stacked on each reference side 320 including under and/or on top of the module 300.

A laser module 300 may have a shell that is in one embodiment formed from separate pieces, thereby allowing ample internal space for mounting electrical and electronic components into the laser module 300 during assembly. The laser module 300 may be manufactured with the reference sides 320 formed with a single shell of a conductive material and the remaining non-reference sides formed with a cap made of a non-conductive material. To construct a shell having one or more such substantially flat and orthogonal surfaces, a manufacture may select the number and position of each reference side 320. The manufacturer may then die-cast an aluminum shell or other material that provides a conducting shell having the selected configuration of reference sides 320. If the die-casting results in a shell having dimensions outside of required tolerances, additional precision may be gained by conventionally machining each reference side 320. Any open sides of the shell may be capped with one or more pieces molded from plastic by minimizing the number of reference sides, manufacturing costs of the laser module 300 may be reduced.

In some embodiments, an aluminum shell contains three reference sides, thereby leaving open three sides for access and eventual capping them with a three-sided plastic piece. In alternative embodiments, an aluminum shell contains four reference sides, thereby leaving open the two sides for access and eventual capping with a two-sided plastic piece. A module containing four references sides may be formed, for example, by injecting molten metal under pressure into a die or mold, as is well known in the art, resulting in a shell forming four sides of a six sided module 300. A plastic piece may be molded and used to form the final two sides of the laser module shell. To improve precision, the reference sides 320 of a shell may be machined to be substantially flat and orthogonal or parallel to other reference sides.

In some embodiments, magnets 301B and 307 are used for attaching and aligning reference sides to other reference sides and to a reference surface 101. In some embodiments, a laser module 300 has a pair of cylindrical magnets 307 floating in a cavity on each of the reference sides 320. The pair of magnets presents both a north pole (N) and a south pole (S) at the face of each reference side.

FIGS. 5A, 5B and 5C show, in sequence, a process of magnetic coupling between two modular laser modules 300 in accordance with the present invention. FIG. 5A shows a first laser module 300-17 repelling a second laser module 300-18. The magnets 307 may be allowed to rotate and roll within this cavity as shown in FIG. 5B. As a reference side 320 of the second laser module 300-18 approaches the first laser module 300-17, the magnets 307 in either or both laser modules will rotate and slide around such that the laser modules will become magnetically attracted and attach to each other as shown in FIG. 5C. The rotation of the pairs of magnets 307 eliminates the need for any predetermined north-south polarity installment of the magnets.

A windowed face, which emits a laser beam, may also be machined as a reference side but not necessarily with non-rotating magnet. A windowed face may have four magnets 301B, permanently embedded near each corner of the face (as shown in FIG. 3A). Any of the reference sides 320, when placed on a ferrous surface, such as the reference surface 101, will magnetically adhere to the ferrous surface. The shell of a laser module 300 may be metallic to conduct electricity but non-ferrous so that the shell will not interfere with the functionality of the magnets 301B and 307.

A laser module 300 using external power conventionally requires two electrical paths to supply electrical power to the laser. In some embodiments, the metallic module shells acts as one of the two conductive paths. The second path may be provided through a flying lead 310 that may be mechanically and/or magnetically and electrically attached to a manually or self-leveling platform 100. The lead 310 may connect to a power ring 102 positioned around the self-leveling platform 100 (as shown in FIG. 1). This ring 102 is electrically isolated from the metallic reference surface 101. One end of the lead 310 may be connected to the laser module 300. The other end of the lead 310 may be free and may be permanently and electrically attached to a small magnet. This small magnet at the end of the lead 310 may then be placed anywhere along the power ring 102 to complete the required two electrical paths. Additionally, the lead 310 may be positioned to protrude from the laser module 300 in such a fashion that it does not interfere with the ability to place any reference side 320 of a laser module 300 against another reference side 320 or against a reference surface 101 of the platform 100.

While the present invention has been described with reference to one or more particular variations, those skilled in the art will recognize that many changes may be made thereto without departing from the spirit and scope of the present invention. Each of these embodiments and obvious variations thereof are contemplated as falling within the spirit and scope of the claimed invention, which is set forth in the following claims.

What is claimed is:

1. A modular system comprising:
   a leveling platform providing a reference surface, wherein the reference surface is made substantially level; and
   one or more light emitting modules attached magnetically to the leveling platform, wherein each of the modules has at least two sides that allow substantially parallel positioning on the reference surface and allow substantially parallel positioning against a side of another light emitting module;
   wherein at least one of the two sides of one of the light emitting modules bears on the reference surface to emit light oriented with respect to the reference surface.

2. The modular system of claim 1, wherein the leveling platform is self-leveling.

3. The modular system of claim 1, wherein the leveling platform is manually-leveling.

4. The modular system of claim 1, wherein one of the at least two sides is perpendicular to a different one of the at least two sides.

5. A modular system comprising:
   a leveling platform providing a reference surface, wherein the reference surface is made substantially level; and
   one or more light emitting modules magnetically detachable from the leveling platform, wherein each of the modules has at least two sides that allow substantially parallel positioning on the reference surface and allow substantially parallel positioning against a side of another light emitting module;
   wherein each of the light emitting modules cooperates with the reference surface to provide oriented light;
   wherein the leveling platform couples electrical power to the light emitting modules.

6. A modular system comprising:
   a leveling platform providing a reference surface, wherein the reference surface is made substantially level; and
   one or more light emitting modules magnetically detachable from the leveling platform, wherein each of the modules has at least two sides that allow substantially parallel positioning on the reference surface and allow substantially parallel positioning against a side of another light emitting module;
   wherein each of the light emitting modules cooperates with the reference surface to provide oriented light;
   wherein:
   the reference surface includes a first electrically conductive area to provide a first path for electrical power; and
   the leveling platform further includes a second electrically conductive area electrically insulated from the first electrically conductive area of the reference surface to provide a second path for electrical power.

7. The modular system of claim 6, wherein the first electrically conductive area includes a ferrous material.

8. A module comprising:
   a housing having a plurality of sides, an aperture defined in a first side of the sides, and a magnetic fastener on each of at least two of the sides including the first side; and
   a light source mounted within the housing; whereby the aperture allows light from the light source to pass from the housing;
   wherein the magnetic fastener on a second of the sides includes a magnetic member rotatable about an axis orthogonal to the first side; and
   wherein the magnetic member includes a pair of magnets.

9. The module of claim 8, further comprising:
   a conductive lead electrically coupled to the light source, and extending from the housing, wherein the housing further includes an insulating member.

10. The module of claim 9, wherein the conductive lead extends from the insulating member.

11. A module comprising:
    a housing having a plurality of sides, an aperture defined in a first side of the sides, and a magnetic fastener on each of at least two of the sides including the first side; and
    a light source mounted within the housing; whereby the aperture allows light from the light source to pass from the housing; and
    wherein each magnetic fastener includes one or more magnets mounted to rotate in a recess in the respective side therein magnetically attaching to another such module with their respective sides in contact.

12. A module comprising:
    a housing having a plurality of sides, an aperture defined in a first side of the sides, and a magnetic fastener on each of at least two of the sides including the first side; and
    a light source mounted within the housing; whereby the aperture allows light from the light source to pass from the housing; and
    wherein a magnetic fastener on the first side having the aperture includes magnets mounted on the first side wherein the magnets are spaced around the aperture.

13. A module comprising:
    a housing having a plurality of sides, an aperture defined in a first side of the sides, and a magnetic fastener on each of at least two of the sides including the first side; and
    a light source mounted within the housing; whereby the aperture allows light from the light source to pass from the housing, further comprising a conductive lead coupled to the light source, wherein the conductive lead extends from the housing.

14. The module of claim 13, wherein the conductive lead comprises a wire and a magnet positioned at a distal end of the conductive wire.

15. The module of claim 13, wherein:
    the housing is electrically coupled to the light source;
    the housing includes a conductive member to provide a first path for electrical power; and
    the conductive lead provides a second path for electrical power.

16. A module comprising:
    a housing having two or more reference sides each adapted to be supported on a reference surface, wherein each reference side defines a corresponding reference plane; and
    a light source in the housing and emitting light having a predetermined orientation with respect to each of the reference planes, further comprising a conductive lead electrically coupled to the light source, wherein the conductive lead extends from the housing.

17. The module of claim 16, wherein the conductive lead comprises a wire and a magnet positioned at a distal end of the conductive wire.

18. The module of claim 16, wherein:
    the housing is electrically coupled to the light source;
    the housing provides a first path for electrical power; and
    the conductive lead provides a second path for electrical power.

19. A module comprising:
a light source;
a housing for the light source and including an electrically conductive member coupled to the light source; and
a conductive lead electrically coupled to the light source, and extending from the housing wherein the conductive lead includes a wire; and
wherein the conductive lead further includes a magnet connected at a distal end of the wire.

20. A laser module comprising:
a housing having an external conductive member providing a conductive surface and the housing having an external non-conductive member;
a conductive lead; and
a laser generator within the housing, the laser generator including
a first conductor electrically coupling the laser generator to the conductive surface of the housing; and
a second conductor electrically coupling the laser generator to the conductive lead.

21. The laser module of claim 20, further comprising magnets positioned on the external conductive member.

22. A laser module comprising:
a light source including a laser diode;
a shell having six sides, wherein the shell includes
an insulating member; and
an electrically conductive member having
an aperture; and
a plurality of the sides are reference sides, wherein
each reference side defines a corresponding reference plane;
at least one of the reference planes is parallel to an axis of the light source;
at least one of the reference planes is orthogonal to the axis of the light source;
at least one of the reference sides includes a pair of magnets mounted for rotation about an axis orthogonal to the reference side; and
wherein the electrically conductive member is electrically coupled to the light source and provides a first path for electrical power; and
a conductive lead including a conductive wire and a magnet positioned at a distal end of the conductive wire; wherein
the conductive wire is electrically coupled to the light source and provides a second path for electrical power; and
the conductive lead extends from the insulating member.

23. A method of providing a light pattern comprising:
making substantially level a reference surface on a leveling platform;
attaching magnetically a reference side of a first light emitting module to the reference surface of the leveling platform; attaching magnetically a reference side of a second light emitting module to the reference surface of the leveling platform;
positioning another reference side of the first module and another reference side of the second module substantially parallel to and against each other; and
providing electrical power to the first and second light emitting modules.

24. The method of claim 23, wherein the positioning includes rotating magnetic poles of a magnetic member in the another reference side of the first module to align attractively with magnetic poles of a magnetic member in the another reference side of the second module.

25. The method of claim 23, further comprising detaching one of the modules.

26. The method of claim 23, further comprising attaching magnetically a reference side of a third light emitting module to the reference surface of the leveling platform.

27. The method of claim 23, further comprising:
detaching the first module from the reference surface of the leveling platform; and
attaching magnetically a reference side of a second light emitting module to the reference surface of the leveling platform.

28. The method of claim 23, further comprising:
detaching the reference side of the first module from the reference surface of the leveling platform; and
attaching magnetically a different reference side of the first module to the reference surface of the leveling platform.

29. A modular system comprising:
a leveling platform providing a reference surface, wherein the reference surface is made substantially level; and
one or more light emitting modules detachable from the leveling platform, wherein each of the modules has at least two sides that allow substantially parallel positioning on the reference surface and allow substantially parallel positioning against a side of another light emitting module;
wherein each of the light emitting modules cooperates with the reference surface to provide oriented light;
the reference surface includes a first electrically conductive area to provide a first path for electrical power; and
the leveling platform further includes a second electrically conductive area electrically insulated from the first electrically conductive area of the reference surface to provide a second path for electrical power.

30. A module comprising:
a housing having a plurality of sides, an aperture defined in a first of the sides, and a magnetic fastener on at least a second of the sides, the magnetic fastener including at least one magnet mounted recessed in the second of the sides and rotating relative to the second of the sides; and
a light source mounted within the housing, whereby the aperture allows light from the light source to pass from the housing.

31. A module comprising:
a housing having a plurality of sides, an aperture defined in a first of the sides, and a magnetic fastener on at least a second of the sides, the magnetic fastener including at least one magnet mounted for rotation on the second of the sides; and
a light source mounted within the housing, whereby the aperture allows light from the light source to pass from the housing, where the magnet fastener includes two cylindrical shaped magnets movable in a cavity defined in the second side.

* * * * *